(12) United States Patent
Fuerst et al.

(10) Patent No.: US 7,221,877 B2
(45) Date of Patent: May 22, 2007

(54) OPTICAL TRANSMISSION SYSTEM FOR HIGH-BIT-RATE TRANSMISSION OF OPTICAL SIGNALS WITH THE AID OF DISPERSION COMPENSATION UNITS

(75) Inventors: Cornelius Fuerst, Munich (DE); Erich Gottwald, Holzkirchen (DE); Christian Scheerer, Ottawa (CA); Andreas Faerbert, Munich (DE); Georg Mohs, Essen (DE)

(73) Assignee: Siemens Aktiengesellschaft, Munich (DE)

( * ) Notice: Subject to any disclaimer, the term of this patent is extended or adjusted under 35 U.S.C. 154(b) by 603 days.

(21) Appl. No.: 10/165,106

(22) Filed: Jun. 6, 2002

(65) Prior Publication Data

US 2003/0007217 A1 Jan. 9, 2003

(30) Foreign Application Priority Data

Jun. 6, 2001 (DE) ................. 101 273 45

(51) Int. Cl.
*H04B 10/00* (2006.01)
(52) U.S. Cl. ........................ 398/159; 398/81
(58) Field of Classification Search ........ 398/147–148, 398/158–159, 81
See application file for complete search history.

(56) References Cited

U.S. PATENT DOCUMENTS 5,629,795 A 5/1997 Suzuki et al.
6,021,235 A 2/2000 Yamamoto et al.
6,574,038 B2 * 6/2003 Tanaka et al. ........... 359/337.5

FOREIGN PATENT DOCUMENTS

DE 199 45 143 4/2001

OTHER PUBLICATIONS

XP-001122602—Wen et al., "Ultralong Lightwave Systems with Incomplete Dispersion Compensations", Journal of Lightwave Technology, vol. 19, No. 4, Apr. 2001, pp. 471-479.
Royset, "Self phase modulation limitations in long nonrepeatered standard fibre transmission: influence from dispersion compensation scheme and modulation format", p. 150-152.
Grau und Freude: "Optische Nachrichtentechnik—Eine Einfuhrung", Springer Verlag, 3 Auflage, 1991, pp. 120-126.
Nuyts, "Dispersion Equalization of a 10 Gb/s Repeatered Transmission System Using Dispersion Compensating Fibers", Journal of Lightwave Technology, vol. 15, No. 1, Jan. 1997, pp. 31-42.
Grau und Freude Optische Nachrichten-technik Eine Einfurhrung Springer-Verlag 2 Auflage 1991, pp. 120-126.

* cited by examiner

*Primary Examiner*—Agustin Bello
(74) *Attorney, Agent, or Firm*—Bell, Boyd & Lloyd LLP

(57) ABSTRACT

In the high-bit-rate transmission of optical signals in an optical transmission system having N optical fiber link sections with, in each case, one optical fiber and one dispersion compensation unit, the absolute-magnitude compensations of the first to Nth dispersion compensation units are dimensioned in such a way that the first to N−1-th fiber link sections is/are overcompensated, in each case, by approximately the same absolute magnitude overcompensation. Furthermore, the absolute-magnitude compensation of the Nth dispersion compensation unit is dimensioned in such a way that the accumulated fiber dispersion at the output of the optical transmission system is virtually completely compensated.

11 Claims, 4 Drawing Sheets

OPTICAL TRANSMISSION SYSTEM FOR HIGH-BIT-RATE TRANSMISSION OF OPTICAL SIGNALS WITH THE AID OF DISPERSION COMPENSATION UNITS

BACKGROUND OF THE INVENTION

The present invention relates to an optical transmission system for high-bit-rate transmission of optical signals having a number of optical fiber link sections with, in each case, one optical fiber and one dispersion compensation unit, the dispersion compensation units having different absolute-magnitude compensations.

In optical transmission systems with high data throughput rates (thus, as in the case of optical transmission systems operating according to the WDM (Wavelength Division Multiplexing) principle as well as in the case of optical single-channel transmission systems), the chromatic dispersion occurring in the transmission of optical signals over the optical fiber and nonlinear effects such as self phase modulation (SPM) or cross phase modulation (XPM) cause distortions in the optical signals to be transmitted. In this connection, see Grau and Freude: "Optische Nachrichtentechik—Eine Einführung", ["Optical Telecommunications Engineering—An introduction"], Springer-Verlag, 3rd Edition, 1991, pages 120 to 126.

Such distortions in the optical signal or data signal to be transmitted depend, inter alia, on the optical launch power of the optical signal. The distortions caused by the chromatic dispersion and the nonlinear effects produce a regeneration-free transmission range for an optical transmission system that is determined, in particular, by the signal-to-noise ratio required for the restoration of the optical signal at the end of an optical fiber link section. The transmission range that can be spanned without regeneration is to be understood here as the optical transmission link over which an optical data signal can be transmitted without the need to carry out a regeneration or "3 R regeneration" (electronic data regeneration with respect to the amplitude, edge and clock of an optically transferred, digital data signal or datastream).

In order to compensate such distortions in the optical data signal, suitable dispersion compensation units are provided or dispersion management is conducted in a fashion adapted to the optical transmission link in the case of the transmission of optical signals over optical standard single-mode fibers. The term dispersion management is to be understood here as a specific arrangement of dispersion compensation units along the optical transmission link (for example, at optical transmitters, at optical repeaters and/or at optical receivers), and as the determination of the suitable dispersion absolute-magnitude compensations for the different dispersion compensation units. Because of the transmission range that can be bridged without regeneration, optical transmission systems are assembled from a number of optical fiber link sections in which the fiber dispersion caused, in each case, in the optical fiber link section under consideration is virtually completely compensated, or partially overcompensated or undercompensated, with the aid of a dispersion compensation unit.

Such dispersion compensation units are configured, for example, as special optical fibers in the case of which the dispersion or fiber dispersion, in particular in the transmission wavelength region, assumes very high negative values owing to a special selection of the refractive index profile of the fiber core and in the surrounding cladding layers of the optical fiber. The dispersion contributions generated by the optical transmission fibers, such as a standard single-mode fiber, can be effectively compensated with the aid of the high negative dispersion values caused by the dispersion-compensating fiber. In addition, the maximum number of optical fiber link sections or the bridgeable range of the optical transmission system can be fixed via the eye pattern (eye opening) of the signal-to-noise ratio of the optical signal or data signal present at the output of the respective optical fiber link section. The minimum eye opening, required for the reconstruction of the optical data signal at the end of the optical fiber link section, of the eye pattern or of the signal-to-noise ratio required therefor, results in a maximum range for a regeneration-free transmission of an optical data signal.

Various dispersion management concepts are adopted for this purpose in optical transmission systems implemented to date, it being possible to carry out the optimum dispersion compensation of an optical transmission link by using optical fiber link sections that are precompensated and/or subsequently compensated or differently overcompensated or undercompensated. A spatially defined distance therefore can be bridged with a fixed number of fiber link sections as a function of the respective data rate, the data format and the fiber properties.

German patent application 19945143.5 discloses for this purpose a dispersion compensation scheme for an optical transmission system in the case of which optical signals are transmitted with data rates of around 10 Gbit/s over a fixed number of optical fiber link sections. In order to increase the transmission range of the optical transmission system, the absolute-magnitude compensations of the dispersion compensation unit at the end of each optical fiber link section are dimensioned in such a way that the remaining accumulated residual dispersion per optical fiber link section rises at least approximately uniformly by the same absolute-magnitude dispersion in each case. That is, the accumulated residual dispersion calculated or estimated for the entire optical transmission system is distributed virtually uniformly over the optical fiber link sections, and as a result each optical fiber link section is undercompensated by virtually the same absolute-magnitude compensation.

Furthermore, U.S. Pat. No. 5,629,795 discloses an optical transmission system that includes a number of optical fiber link sections with, in each case, one optical fiber and one dispersion-compensating medium. The optical transmission system is divided for this purpose into a multiplicity of optical fiber link sections. In each of these optical fiber link sections, with the exception of the last one, the dispersion-compensating media are used together with the respective fiber link section to compensate the accumulated wavelength dispersion completely or partially (undercompensation). The timing jitter caused in the optical transmission signal by the Gordon House effect is virtually completely eliminated by the described procedure. The optical signals transmitted in this process are transmitted in return-to-zero format with a transmission rate of approximately 20 Gbit/s. Such a dispersion management certainly leads to a reduction in the timing jitter caused by the Gordon House effect in the case of transmission bit rates of 20 Gbit/s, but it is impossible thereby to achieve any substantial improvement in range, in particular for high-bit-rate optical transmission systems with data transmission rates greater than 20 Gbit/s.

It is, therefore, an object of the present invention to configure an optical transmission system for high-bit-rate transmission of optical signals of the type mentioned at the beginning in such a way that the signal distortions caused by the fiber dispersion are reduced, and the transmission range that can be bridged without regeneration is increased.

SUMMARY OF THE INVENTION

A key aspect of the present invention is that the absolute-magnitude compensations of the first to Nth dispersion compensation unit are dimensioned in such a way that the first to N−1-th fiber link sections is/are overcompensated in each case by approximately the same absolute magnitude overcompensation, and in that the absolute-magnitude compensation of the Nth dispersion compensation unit is dimensioned in such a way that the accumulated fiber dispersion at the output of the optical transmission system is virtually completely compensated. The maximum regeneration-free transmission range is substantially increased by such a dimensioning of the absolute-magnitude compensations in conjunction with an unchanged mean launch signal power per fiber link section, wherein there is a substantial reduction in the restriction of the maximum range prescribed by nonlinearities, for example, self phase modulation or cross phase modulation. Moreover, an increase in the maximum total power of the optical signals that can be launched into the optical transmission system is rendered possible by the dispersion management according to the present invention, as a result of which an additional increase in range can be achieved.

According to a further embodiment of the present invention, the absolute magnitude overcompensation is fixed by the quotient of a calculated or estimated total absolute-magnitude compensation and the number N of the fiber link sections. Furthermore, this total absolute-magnitude compensation is yielded by calculation or estimation starting from the maximum total power of the optical signals that can be launched into the optical transmission system. Here, the maximum total power of the optical signals that can be launched into the optical transmission system is equal to the product of the number N of the fiber link sections and the average launch power per fiber link section, and is therefore constant. Furthermore, the total absolute-magnitude compensation is a function of the data rate, the data format and the fiber type. According to the present invention, the maximum total power $P_{max}$ that can be launched given the existing system properties of the optical transmission system is advantageously determined, for example, by computer-aided simulation of the optical transmission system or by experimental investigations and, starting from the average launch power per fiber link section $P_{launch}$, for example, the number N of the optical fiber sections that can be bridged without regeneration is advantageously determined. Use is made for this purpose of the relationship $$P_{max} = P_{launch} * N = \text{const.}$$

known from the publication "Optimised dispersion management scheme for long-haul optical communication systems" by A. Färbert, et al., Electronic Letters, Vol. 35, No. 21, p. 1865-1866, 1999.

The non-return-to-zero data format (NRZ) or the return-to-zero data format (RZ) is advantageously provided for transmitting the optical signals. When the optical signals are transmitted in NRZ data format, the dispersion management scheme according to the present invention substantially increases the regeneration-free transmission range, whereas in the case of the RZ data format the increase in the regeneration-free transmission range turns out to be smaller.

Additional features and advantages of the present invention are described in, and will be apparent from, the following Detailed Description of the Invention and the Figures.

DETAILED DESCRIPTION OF THE INVENTION

Figure 1:
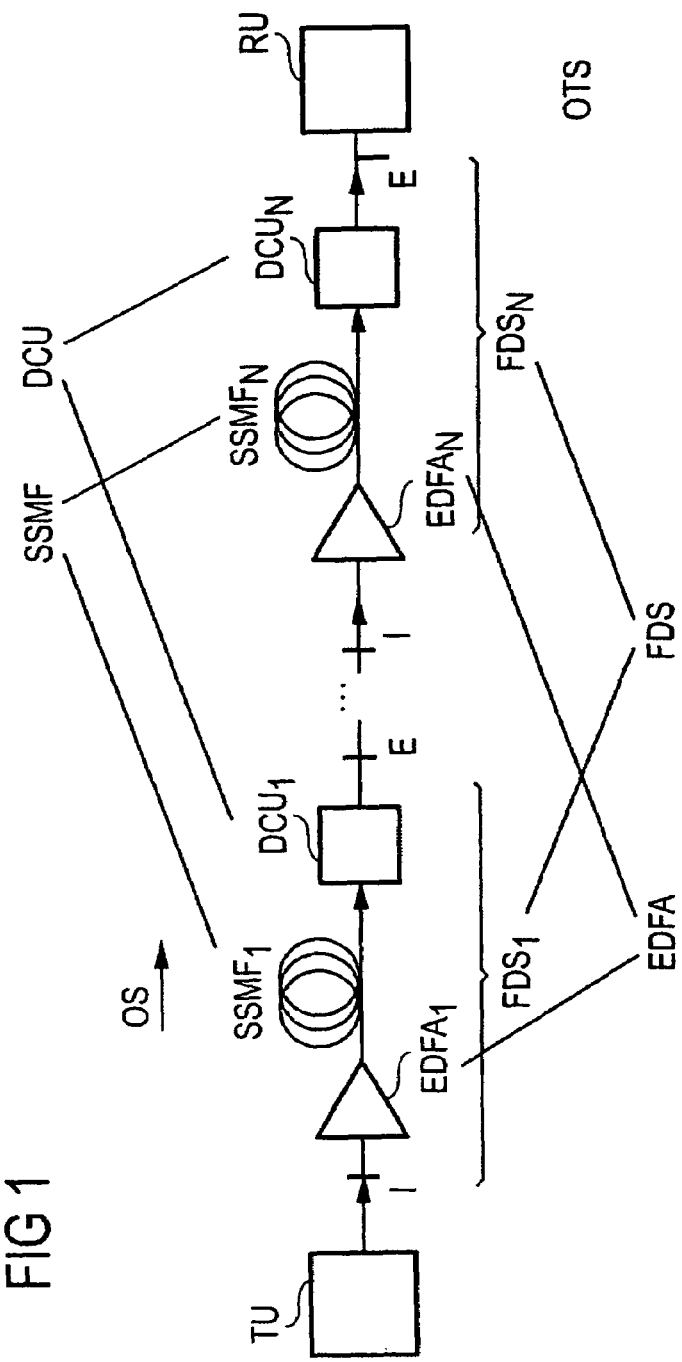
FIG. 1 shows the design principle of an optical transmission system.

FIG. 1 is a schematic of an optical transmission system OTS that has an optical transmitting device TU and an optical receiving device RU. The optical transmitting device TU is connected via N optical fiber link sections $FDS_1$ to $FDS_N$, having one input I and one output E in each case, to the optical receiving device RU, which in each case have an optical amplifier EDFA, an optical fiber SSMF and an optical dispersion compensation unit DCU.

A first and Nth optical fiber link section $FDS_1, FDS_N$ are illustrated by way of example in FIG. 1, a second to Nth fiber link section $FDS_2$ to $FDS_{N-1}$ being indicated with the aid of a dotted line. Furthermore, the first optical fiber link section $FDS_1$ includes a first optical amplifier $EDFA_1$, a first optical fiber $SSMF_1$, such as an optical standard single-mode fiber (SSMF), and a first optical dispersion compensation unit $DCU_1$, it also being possible to provide an optical preamplifier (not illustrated in FIG. 1) between the first optical fiber $SSMF_1$ and the first optical dispersion compensation unit $DCU_1$. By analogy therewith, the Nth optical fiber link section $FDS_N$ has an Nth optical amplifier $EFDA_N$, an Nth optical fiber $SSMF_N$ and an Nth optical dispersion compensation unit $DCU_N$. By analogy, it is also possible to provide a further optical preamplifier (not illustrated in FIG. 1) between the Nth optical fiber $SSMF_N$ and the Nth optical dispersion compensation unit $DCU_N$. The N optical dispersion compensation units $DCU_1$ to $DCU_N$ have different absolute-magnitude compensations $D_1$ to $D_N$ in each case.

The optical data signal or the optical datastream OS is transferred by the optical transmitting device TU to the input I of the first optical fiber link section $FDS_1$. The optical data signal OS is amplified within the first optical fiber link section $FDS_1$ with the aid of the first optical amplifier $EDFA_1$, and transmitted over the first optical fiber $SSMF_1$ to the first dispersion compensation unit $DCU_1$. The fiber dispersion, caused by the optical transmission over the first optical fiber $SSMF_1$, of the optical data signal OS is overcompensated in the first dispersion compensation unit $DCU_1$ by the absolute magnitude overcompensation $D_{over}$ according to the present invention. That is, the first absolute-magnitude compensation $D_1$ of the first dispersion compensation unit $DCU_1$ overshoots the fiber dispersion d caused in the first fiber link section $FDS_1$ approximately by the absolute magnitude overcompensation $D_{over}$ according to the present invention. The absolute magnitude overcompensation $D_{over}$ is fixed according to the present invention by the quotient of a total absolute-magnitude compensation $D_{total}$, calculated or estimated for the optical transmission system OTS under consideration, and the number N of the fiber link sections $FDS_1$ to $FDS_N$ of the optical transmission system OTS; that is to say, $$D_{over}=D_{total}/N.$$

This results in a negative amount for the accumulated fiber dispersion $d_{akk}$ resulting after the compensation at the end of the first fiber link section $FDS_1$.

The total absolute-magnitude dispersion $D_{total}$ is influenced differently by the system properties and/or by the fiber nonlinearities as well as by the fiber dispersion in the case of different data transmission rates and data transmission formats. This total absolute-magnitude dispersion $D_{total}$ is therefore determined according to the present invention with the aid of computer aided simulations or experimental investigations, in each case for the system properties of the optical transmission system OTS under consideration, starting with the maximum total power $P_{max}$ launched into the optical transmission system OTS. Here, the number N of optical fiber link sections that can be bridged without regeneration in the case of the total power $P_{max}$ under consideration can be calculated, $$P_{max}=P_{launch}*N$$

using the maximum total power $P_{max}$ that can be launched into the optical transmission system OTS, by selecting the average launch power $P_{launch}$ per fiber link section FDS.

The total absolute-magnitude compensation $D_{total}$ specifies the minimum absolute-magnitude compensation required for the recovery of the data from the optical data signal OS for an optical transmission system OTS constructed from two optical fiber link sections $FDS_1$, $FDS_2$, by which the first optical fiber link section $FDS_1$, for example, would need to be compensated in order to obtain at the end of the second fiber link section $FDS_2$ the signal-to-noise ratio required for error-free reconstruction of the transmitted data signal OS.

The optical data signal OS received at the end E of the first optical link section $FDS_1$ is led to the input I of the second optical fiber link section $FDS_2$. Here, the optical data signal OS is amplified, once again, by the second optical amplifier $EDFA_2$ and transmitted over the second optical fiber $SSMF_2$ to the second dispersion compensation unit $DCU_2$. The fiber dispersion d caused in the second optical fiber $SSMF_2$ is compensated by the second dispersion compensation unit $DCU_2$ with a second absolute-magnitude compensation $D_2$ in such a way that an overcompensation of the second fiber link section $FDS_2$ is, once again, carried out by approximately the same absolute magnitude overcompensation $D_{over}$. Consequently, in the exemplary embodiment under consideration, the second fiber link section $FDS_2$ has an accumulated fiber dispersion $d_{akk}$ of approximately twice the negative absolute magnitude overcompensation $D_{over}$. The overcompensation according to the present invention is carried out by analogy therewith in the third to N−1-th fiber link sections $FDS_3$ to $FDS_{N-1}$.

The optical data signal OS received at the input I of the Nth optical fiber link section $FDS_N$ is amplified with the aid of the Nth optical amplifier $EDFA_N$, and transferred via the Nth optical fiber $SSMF_N$ to the Nth dispersion compensation unit $DCU_N$. The fiber dispersion d, caused by the Nth optical fiber $SSMF_N$, of the optical data signal OS is compensated in the Nth dispersion compensation unit $DCU_N$ until the accumulated fiber dispersion $d_{akk}$ of the optical data signal OS is virtually completely compensated. That is, the Nth absolute-magnitude compensation $D_N$ of the Nth dispersion compensation unit $DCU_N$ is dimensioned in such a way that the accumulated fiber dispersion $d_{akk}$ at the output E of the optical transmission system OTS is virtually completely compensated. The optical data signal OS present at the output E of the Nth optical fiber link section $FDS_N$ is transmitted to the optical receiving device RU and, if appropriate, subjected to a "3R" regeneration (not illustrated in FIG. 1) before further processing.

Figure 2:
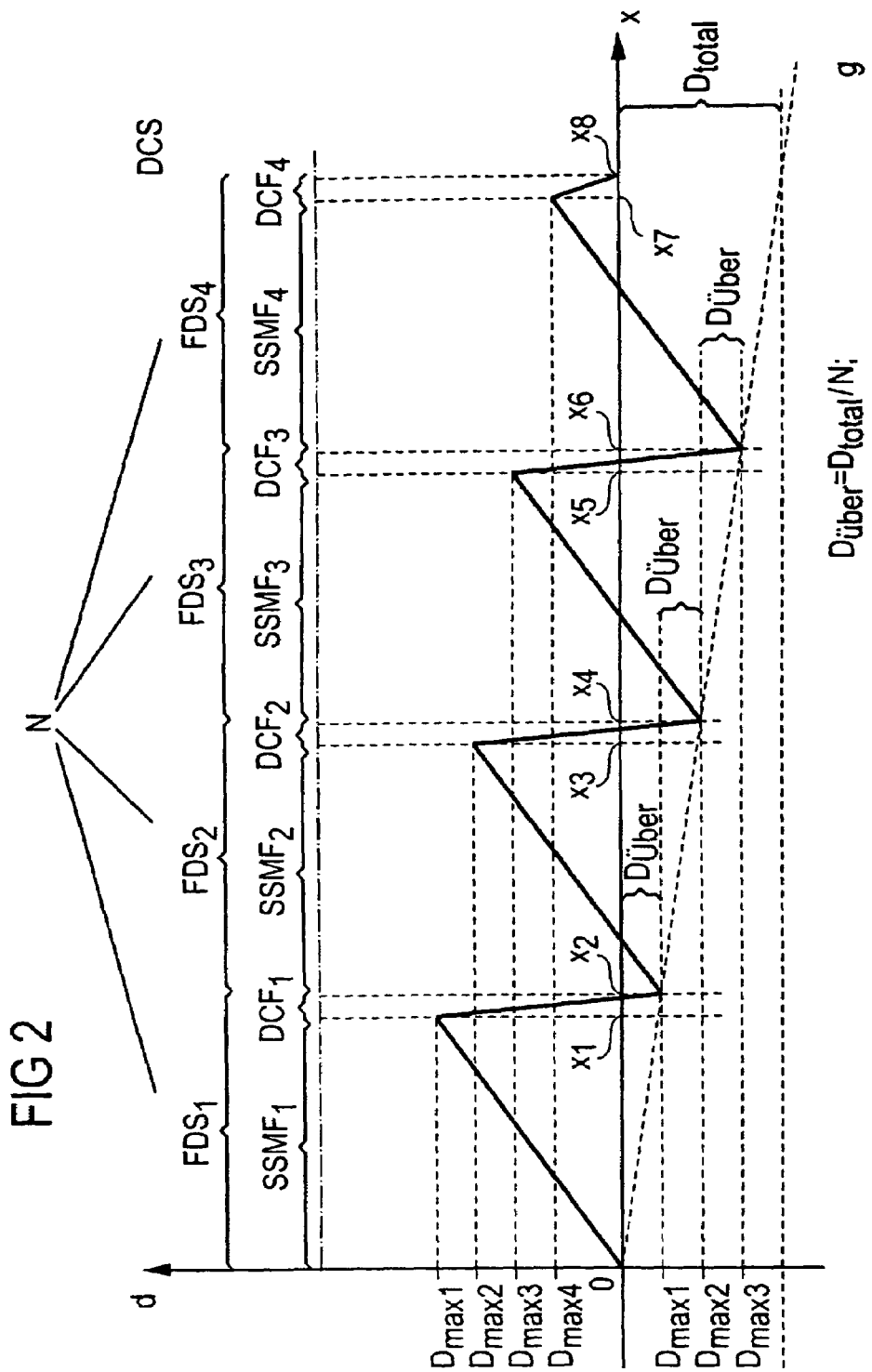
FIG. 2 shows a diagram of the dispersion management scheme according to the present invention.

A diagram of a dispersion management scheme DCS according to the present invention is illustrated by way of example in FIG. 2. It is clear, in turn, from this that the optical transmission system OTS is assembled according to the present invention from a number of optical fiber link sections FDS that, in each case, have one optical fiber SSMF and one dispersion compensation unit DCU; for example, one dispersion-compensation fiber. In order to explain the dispersion management scheme DCS according to the present invention, the number of optical fiber link sections is restricted to four (N=4), such that a first, second, third and fourth optical fiber link section $FDS_1$,$FDS_2$,$FDS_3$,$FDS_4$ result in FIG. 2, the first optical fiber link section $FDS_1$ having a first optical fiber $SSMF_1$ and a first optical dispersion compensation unit $DCU_1$, the second optical fiber link section $FDS_2$ having a second optical fiber $SSMF_2$ and a second optical dispersion compensation unit $DCU_2$, the third optical fiber link section $FDS_3$ having a third optical fiber $SSMF_3$ and a third optical dispersion compensation unit $DCU_3$, and the fourth optical fiber link section $FDS_4$ having a fourth optical fiber $SSMF_4$ and a fourth optical dispersion compensation unit $DCU_4$. Here, a virtually equal length is selected, for example, for the first to fourth optical fibers $SSMF_1$ to $SSMF_4$ and for the first to third dispersion-compensating fibers $DCU_1$ to $DCU_3$ for the dispersion management scheme DCS of the exemplary embodiment. However, if they exceed 20 km, the length of the optical fibers SSMF is unimportant for the dispersion management scheme DCS according to the present invention. Furthermore, the length of the dispersion-compensating fibers and the absolute-magnitude compensations D of the dispersion compensation units DCU can also vary if the sum of the absolute-magnitude compensations corresponds approximately to the calculated or estimated total absolute-magnitude dispersion $D_{total}$.

The diagram has a horizontal axis (abscissa) and a vertical axis (ordinate) x, d, the distance x from the optical transmitting device TV or the range of the optical data transmission being plotted along the horizontal axis, and the fiber dispersion d being plotted along the vertical axis d.

It will be clear from FIG. 2 that the fiber dispersion d of an optical data signal OS of the optical transmitting device TU (x=0) present at the input I of the first optical fiber link section $FDS_1$ rises linearly along the first optical fiber $SSMF_1$ and assumes a first maximum absolute-magnitude dispersion $D_{max1}$ at the end of the first optical fiber $x_1$. The first maximum absolute-magnitude dispersion $D_{max1}$ is overcompensated with the aid of the first dispersion compensation unit $DCU_1$ or the first dispersion-compensating fiber; that is to say, there is present at the end of the first dispersion-compensating fiber $x_2$ a first minimum absolute-magnitude dispersion $D_{min1}$ that corresponds to the absolute magnitude overcompensation $D_{over}$ in accordance with the present invention, but with a negative sign.

Owing to the subsequent second optical fiber $SSMF_2$, the fiber dispersion d increases from the first minimum absolute-magnitude dispersion $D_{min1}$ up to a second maximum absolute-magnitude dispersion $D_{max2}$ that is present at the end of the second optical fiber $x_3$. By comparison with the first maximum absolute-magnitude dispersion $D_{max1}$, the second maximum absolute-magnitude dispersion $D_{max2}$ has been reduced approximately by the absolute magnitude overcompensation $D_{over}$ according to the present invention; that is to say, the overcompensation present in the first fiber link section $FDS_1$ has a precompensating effect on the following second fiber link section $FDS_2$. The second maximum absolute-magnitude dispersion $D_{max2}$ is compensated with the aid of the second dispersion compensation unit $DCU_2$ or the second dispersion-compensating fiber until the second minimum absolute-magnitude dispersion $D_{min2}$ corresponds approximately to twice the absolute magnitude overcompensation $2*D_{over}$ according to the present invention; that is to say, the accumulated fiber dispersion $d_{akk}$ rises virtually uniformly per optical fiber link section FDS by the absolute magnitude overcompensation $D_{over}$ in each case. Thus, there is present at the end of the second dispersion-compensating fiber $x_4$ a second minimum absolute-magnitude dispersion $D_{min2}$ that corresponds to twice the absolute magnitude overcompensation $D_{over}$ according to the present invention, with a negative sign.

In the third optical fiber $SSMF_3$, the optical data signal OS transmitted by the second dispersion-compensating fiber $DCU_2$ to the third optical fiber $SSMF_3$ once again experiences signal distortions caused by the fiber dispersion d. The fiber dispersion d therefore assumes at the end of the third optical fiber $x_5$ a third maximum absolute-magnitude dispersion $D_{max3}$ that again is smaller by approximately the absolute magnitude overcompensation $D_{over}$ according to the present invention than the second maximum absolute-magnitude dispersion $D_{max2}$. The third maximum absolute-magnitude dispersion $D_{max3}$ is overcompensated by the third optical dispersion compensation unit $DCU_3$ in such a way that the third minimum absolute-magnitude dispersion $D_{min3}$ corresponds to three times the absolute magnitude overcompensation $D_{over}$ according to the present invention, with a negative sign.

It also may be seen from FIG. 2 that the fiber dispersion d continues to increase in the fourth fiber link section $FDS_4$ and has a fourth maximum absolute-magnitude dispersion $D_{max4}$ at the end of the fourth optical fiber $x_7$. The fourth maximum absolute-magnitude dispersion $D_{max4}$ is reduced according to the present invention with the aid of the fourth dispersion compensation unit $DCU_4$ in such a way that the accumulated fiber dispersion $d_{akk}$ is virtually completely compensated at the end of the fourth fiber link section $X_8$; that is to say, at the output E of the optical transmission system OTS. Consequently, in the exemplary embodiment under consideration, an undercompensation is carried out in the fourth fiber link section $FDS_4$ with the aim of fully compensating the total accumulated fiber dispersion $d_{akk}$.

Uniformly "dividing" the total absolute-magnitude compensation $D_{total}$ calculated or estimated for the respective optical transmission system OTS over a fixed number N of fiber link sections FDS with the aid of the absolute magnitude overcompensation $D_{over}$ according to the present invention, the last or Nth fiber link section $FDS_N$ being completely compensated, more than doubles the transmission range $x_8$ that can be bridged without regeneration.

Consequently, by comparison with the complete compensation of the fiber dispersion d per fiber link section FDS, the range that can be bridged without regeneration is substantially increased by the dispersion management scheme DCS according to the present invention of the distributed overcompensation, as a result of which the number N of fiber link sections FDS that can be bridged can be doubled in conjunction with a virtually constant total launch power $P_{max}$.

In addition, a fiber link section FDS having one optical fiber SSMF and one dispersion compensation unit DCF can be configured as an optical transmission module. The optical transmission system OTS thereby can be formed by a series circuit of such optical transmission modules. In practice, such a modular design substantially facilitates the implementation of an optical transmission link or expansion of an existing optical transmission link OTS.

Figure 3B:
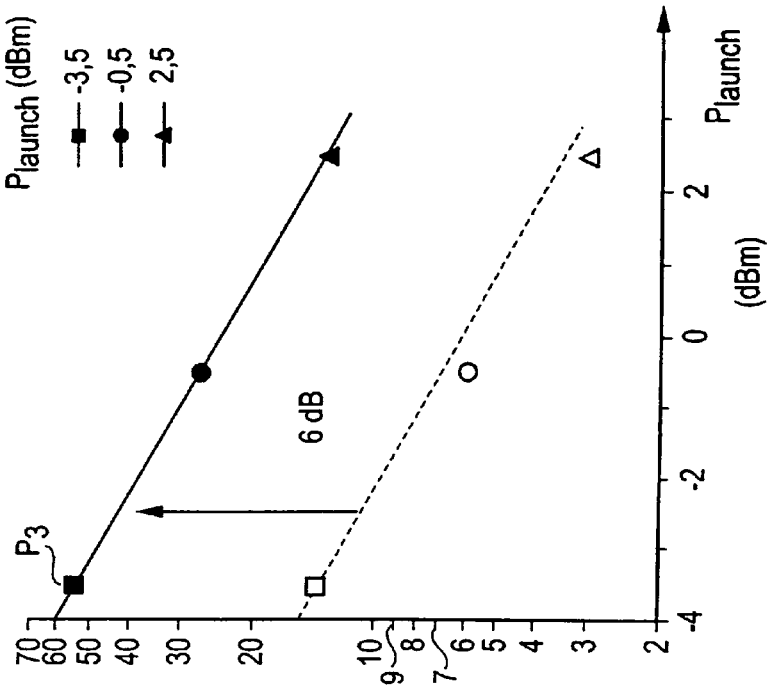
FIGS. 3a and 3b show, in a further diagram, the number of compensated fiber link sections that can be bridged without regeneration as a function of the selected dispersion absolute-magnitude compensations for different average input signal powers.
Figure 3A:
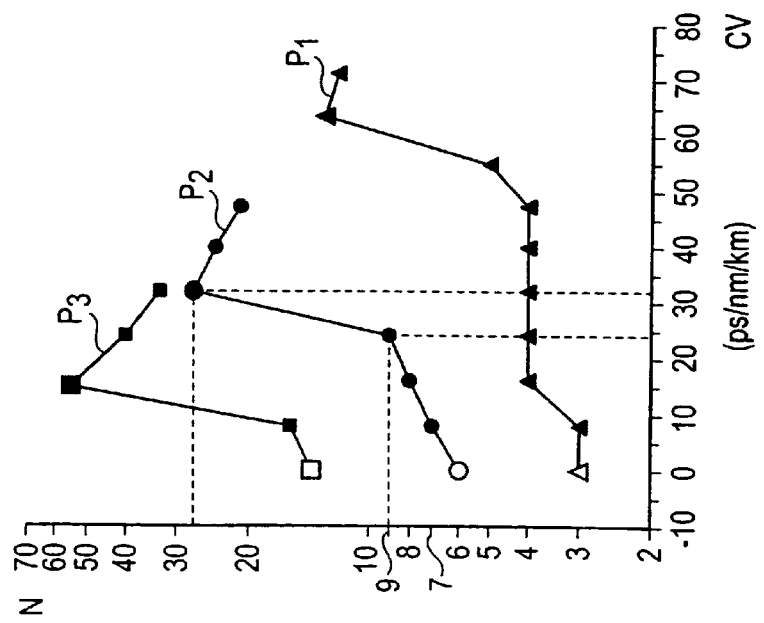

The number N of the compensated fiber link sections FDS that can be bridged without regeneration is illustrated in FIG. 3a in a further diagram as a function of the distributed overcompensation CV for different average launch powers $P_{launch}$ of the optical data signal OS, and in FIG. 3b as a function of the average launch powers $P_{launch}$. The curve profiles illustrated in FIGS. 3a and 3b represent the system response of an optical transmission system OTS with an optical standard single-mode fiber SSMF, the optical data signals OS being transmitted in NRZ data transmission format and with a data transmission rate of 40 Gbit/s.

The diagram illustrated in FIG. 3a has a horizontal axis (abscissa) CV and a vertical axis (ordinate) N, the mean absolute-magnitude compensations CV provided for dispersion compensation being plotted on the horizontal axis CV in ps/nm/km, and the number N of the fiber link sections FDS of the optical transmission system OTS that can be bridged without regeneration being illustrated along the vertical axis N. Here, an absolute-magnitude compensation D of 0 ps/nm/km plotted on the horizontal axis CV signifies complete compensation of the fiber dispersion d occurring in the respective fiber link section FDS; that is to say, all absolute-magnitude compensations D greater than the illustrated value of 0 ps/nm/km correspond to a mean overcompensation of the fiber link sections FDS under consideration.

Illustrated in FIG. 3a are a first, second and third curve $P_1, P_2, P_3$ that indicate the increase in the number N of fiber link sections FDS that can be bridged without regeneration in conjunction with different mean absolute-magnitude compensations D for different mean launch powers $P_{launch}$ of the optical data signals OS per fiber link section FDS. The optical data signal OS has a mean launch power $P_{launch}$ per fiber link section FDS of 2.5 dBm in the case of the first curve $P_1$, of −0.5 dBm in the case of the second curve $P_2$, and of −3.5 dBm in the case of the third curve $P_3$. The increase in the number N of bridgeable fiber link sections FDS from the first to the third curve $P_1$ to $P_3$ shows clearly the regularity in the constant total launch power $P_{max}$ that is given by the product of the number N of fiber link sections FDS and the mean launch powers $P_{launch}$. In general, the increase in the number N of fiber link sections FDS that can be bridged without regeneration with increasing overcompensation up to the absolute magnitude overcompensation $D_{over}$ according to the present invention can be detected from the rise in the illustrated first to third curve profiles $P_1, P_2, P_3$. Thus, an increase in the number N from 9 to approximately 28 is possible in the case of the second curve $P_2$ by increasing the mean overcompensation from 24.5 ps/nm/km to the absolute magnitude overcompensation $D_{over}$ according to the present invention of 32 ps/nm/km, for example.

The maximum increase in the number N of fiber link sections FDS that can be bridged without regeneration is illustrated in FIG. 3b as a function of the mean launch power $P_{launch}$ per fiber link section FDS. For this purpose, the minimum and maximum numbers N of the fiber link sections FDS that can be bridged without regeneration from FIG. 3a are plotted, for the purpose of comparison, for the respective first, second and third mean launch powers $P_{launch}$ of the first, second and third curves $P_1, P_2, P_3$. An average improvement by 6 dB in the number N of fiber link sections FDS that can be bridged without regeneration may be seen from the curve profiles.

Figure 4:
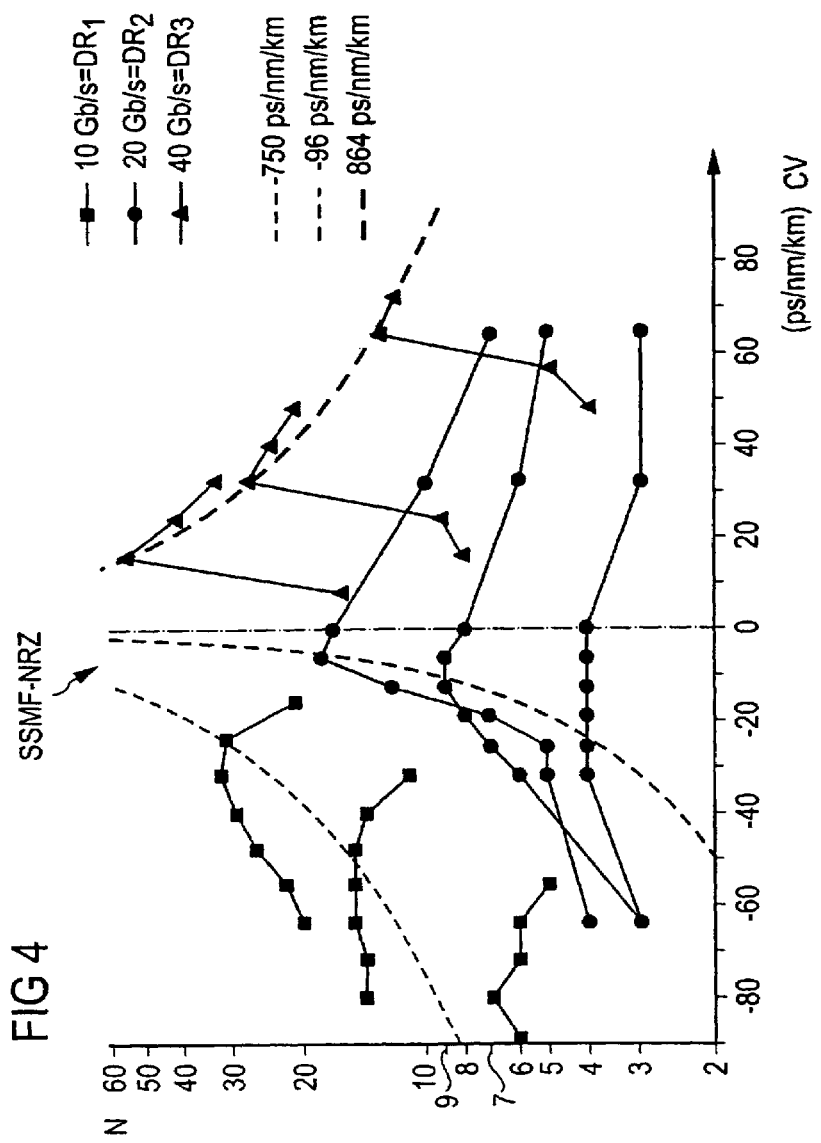
FIG. 4 shows, in a further diagram, the number of compensated fiber link sections that can be bridged without regeneration as a function of the selected dispersion absolute-magnitude compensations for different data rates.

Illustrated in a further diagram in FIG. 4 as a function of the selected mean dispersion absolute-magnitude compensations CV for a first, second and third data rate $DR_1$, $DR_2$, $DR_3$ is the number N of compensated fiber link sections that can be bridged without regeneration. Available once again as measuring system was an optical transmission system OTS that was constructed from optical standard single-mode fibers SSMF and in the case of which the optical data signals OS were transmitted in NRZ data format NRZ and with a data rate of 40 Gbit/s.

The different curves $P_1,P_2,P_3$ illustrated in FIG. 3a and differing in terms of the mean launch powers $P_{launch}$ are illustrated in FIG. 4 in each case for a first data rate $DR_1$ of 10 Gbit/s, a second data rate $DR_2$ of 20 Gbit/s and a third data rate $DR_3$ of 40 Gbit/s. It is clear from the curve profiles that an increase in the number N of fiber link sections FDS that can be bridged without regeneration results from a distributed undercompensation at the first data rate $DR_1$, from virtually complete compensation at the second data $DR_2$, and from overcompensation at the third data rate $DR_3$. Clearly to be seen from this is the transition from distributed undercompensation at lower bit rates (approximately 10 Gbit/s) to the distributed overcompensation according to the present invention at higher bit rates (approximately 40 Gbit/s), which is fixed by a critical data rate $DR_{krit}$ depending on the transmission fiber parameters of the optical fiber SSMF. This critical data rate $D_{krit}$ is at approximately 25 Gbit/s for a standard single-mode fiber SSMF with a fiber dispersion d of 17 ps/nm/km. The critical data rate $DR_{krit}$ can rise to approximately 50 Gbit/s in the case of a dispersion-shifted fiber such as, for example, a non-zero dispersion shifted fiber (NZDSF) with a fiber dispersion d of, for example, 4 ps/nm/km. The critical data rates $DR_{krit}$ of optical fibers with other fiber dispersion values d may be interpolated via the following relationship:

$$DR_{krit} = \text{const.}/\sqrt{d}$$

It is also to be seen from the curve profiles illustrated in FIG. 4 that the maximum number N of bridgeable fiber link sections FDS with different mean launch powers $P_{launch}$ come to lie on a 1/x curve for a data rate DR. This shows that the product of the maximum number N of fiber link sections FDS that can be bridged without regeneration and the absolute magnitude overcompensation $D_{over}$ according to the present invention, which corresponds to the mean absolute-magnitude compensation CV in the case, for example, of a third data rate $DR_3$ of 40 Gbit/s, is constant, that is to say:

$$D_{over} * N = \text{const.}$$

The dispersion compensation scheme DCS according to the present invention for high-bit-rate optical data transmission is in no way restricted to optical transmission systems OTS with optical standard single-mode fibers, but also can be used for optical transmission systems OTS with other fiber types; for example, dispersion-shifted optical fibers. Again, the dispersion compensation scheme according to the present invention also can be applied to optical transmission systems OTS that use further data transmission formats (not explicitly named) for transmission of optical signals OS.

Although the present invention has been described with reference to specific embodiments, those of skill in the art will recognize that changes may be made thereto without departing from the spirit and scope of the present invention as set forth in the hereafter appended claims.

The invention claimed is:

1. An optical transmission system for high-bit-rate transmission of optical signals comprising N optical fiber link sections, with each optical fiber link section including one optical fiber and one dispersion compensation unit, the absolute-magnitude compensations of the first to Nth dispersion compensation units being dimensioned such that the first to N−1-th fiber link sections are respectively overcompensated by approximately a same absolute-magnitude overcompensation, and an absolute-magnitude compensation of the Nth dispersion compensation unit being dimensioned such that an accumulated fiber dispersion at an output of the optical transmission system is substantially compensated, wherein the absolute magnitude overcompensation is fixed by a quotient of a calculated total absolute-magnitude compensation and the number N of the fiber link sections, and wherein the total absolute-magnitude compensation is based on a minimum absolute-magnitude compensation required for the recovery of data from an optical data signal in the optical transmission system, said minimum absolute-magnitude compensation compensating one of the fiber link sections to obtain a signal-to-noise ratio that allows error-free reconstruction of the data signal at the end of a second fiber link section.

2. An optical transmission system as claimed in claim 1, wherein the total absolute-magnitude compensation is yielded by a respective one of a calculation and an estimation starting from a maximum total power of the optical signals that can be launched into the optical transmission system.

3. An optical transmission as claimed in claim 1, wherein the total absolute-magnitude compensation is a function of data rate, data format and fiber type.

4. An optical transmission system as claimed in claim 2, wherein the maximum total power of the optical signals that can be launched into the optical transmission system is equal to a product of the number N of the fiber link sections and a average launch power per fiber link section.

5. An optical transmission system as claimed in claim 1, wherein data rates greater than 20 Gbits/s are provided for the high-bit-rate transmission of the optical signals.

6. An optical transmission system as claimed in claim 1, wherein a non-return-to-zero data format is provided for transmitting the optical signals.

7. An optical transmission system as claimed in claim 1, wherein a return-to-zero data format is provided form transmitting the optical signals.

8. An optical transmission system as claimed in claim 1, wherein optical fibers having a minimum length of 20 kilometers are provided in the fiber link sections.

9. An optical transmission system as claimed in claim 1, wherein the optical fibers are standard single-mode fibers.

10. An optical transmission system as claimed in claim 1, wherein the optical fibers are dispersion-shifted optical fibers.

11. An optical transmission system as claimed in claim 1, further comprising a plurality of optical transmission modules respectively formed from a fiber link section having one optical fiber and one dispersion compensation unit, wherein the optical transmission system is formed from a plurality of optical transmission modules arranged in series.

* * * * *